United States Patent [19]
Brown

[11] 3,817,098
[45] June 18, 1974

[54] AXIAL FLUID FLOW AND SOUND SPEED

[75] Inventor: Alvin E. Brown, Redwood, Calif.

[73] Assignee: Saratoga Systems, Inc., Cupertino, Calif.

[22] Filed: Aug. 9, 1972

[21] Appl. No.: 278,987

[52] U.S. Cl............................................. 73/194 A
[51] Int. Cl......................... G01p 5/00, G01h 3/00
[58] Field of Search................................... 73/194 A

[56] References Cited
UNITED STATES PATENTS

| | | | |
|---|---|---|---|
| 2,669,121 | 2/1954 | Garman et al. | 73/194 A |
| 2,708,366 | 5/1955 | Blocher et al. | 79/194 A |
| 3,678,731 | 7/1972 | Wells et al. | 73/194 A |

FOREIGN PATENTS OR APPLICATIONS

| | | | |
|---|---|---|---|
| 157,807 | 3/1964 | U.S.S.R. | 73/194 A |
| 191,155 | 7/1967 | U.S.S.R. | 73/194 A |

*Primary Examiner*—James J. Gill
*Attorney, Agent, or Firm*—Flehr, Hohbach, Test, Albritton & Herbert

[57] ABSTRACT

An apparatus and method for obtaining flow and sound speed data using ultrasonic energy transducers in communication with a fluid conducted through a conveyance. Appropriate electronic circuitry is included to generate energy for transmission through the fluid and to receive and reduce the transmitted energy to provide sound speed and average flow velocity. Average flow velocity is available directly without knowledge of flow profile by sampling a sufficient length of flow to remove dominance by single turbulence patterns and by filling the conveyance with the ultrasonic wave front thereby sampling all elements of the flow. Stable measurement is obtained in the flow transition zone and for conveyances with small internal dimensions.

7 Claims, 4 Drawing Figures

AXIAL FLUID FLOW AND SOUND SPEED

CROSS REFERENCES

Reference is made to copending applications, Ser. No. 250,760 filed May 5, 1972 and Ser. No. 286,712 filed July 3, 1972.

BACKGROUND OF THE INVENTION

The invention relates to fluid flow and sound speed measurement apparatus and more particularly to an apparatus and method which passes the measuring energy wave in an axial direction through the fluid conveyance parallel to the longitudinal component of flow.

In flowing fluids there is a transition phase between laminar flow and turbulent flow wherein existing flow measurement devices exhibit erratic and erroneous flow indications. Laminar flow exists in a fluid below a Reynolds number of approximately 2,000. When Reynolds numbers exist in a flowing medium immediately above 2,000 to an upper limit of approximately 4,000 there is an uncertainty as to the type of flow existing, laminar or turbulent, and the flow may be alternating between the two states throughout the fluid mass. The actual range of uncertainty depends on factors such as the smoothness of the inside diameter of the fluid conveyance, and because of such uncertainty of the flow nature for Reynolds numbers in this region is called the transition zone. Flow meter indications often jump radically and become unstable in this zone.

It is theorized that the reasons for this flow instability in the transition zone is due to many small turbulences or swirls in the flow stream which alternately occur and lapse back into laminar flow providing a flow-meter indication which is unstable when the turbulences and alternate laminar flow patterns are metered individually. Flow meters of a standard type are of little use for flow occurring in this region.

Flow metering systems utilizing ultrasonic energy transmission through a flowing media generally transmit a wave across a flowing medium at an angle to the major flow direction component. Flow profile information is required to obtain complete flow information from the sampling measurements. For small diameter pipes of the order of an inch and a half in diameter or less the angular placement of 45° or 60° is not practical because of the size of the transducer and the extremely short fluid path lengths that exist between the transducers. A flow and sound speed metering system for fluids in a fluid conveyance is needed for conveyances of small cross section or for flow in the transition zone. Such a system is also needed for use with fluid conveyances of larger cross section where flow profile is either unknown or difficult to obtain.

SUMMARY AND OBJECTS OF THE INVENTION

The fluid flow and sound speed meter for use in measuring rate and volume of flow and sound speed in a fluid carried in a conveyance uses ultrasonic energy transducers in communication with the fluid. The transducers are capable of filling the conveyance with the ultrasonic energy wave forming a uniform longitudinal wave face travelling within a section of the conveyance to be received by a second transducer spaced at some predetermined longitudinal distance along the section. The fluid being metered enters the measurement section of the conveyance at an inlet adjacent to one transducer and exits the section from an outlet adjacent the other transducer. Electronic circuitry is provided for use with the transducers for generating and receiving energy pulses and reducing the received pulses to extract flow and sound speed data therefrom. The distance between the transducers is sufficient to provide for averaging the uniform longitudinal wave front velocity through laminar and turbulent flow areas imparting stability to flow and sound speed data collected in the flow transition zone.

In general, it is an object of the axial fluid flow and sound speed measurement apparatus and method to provide measurement for flow in small cross section fluid conveyances.

Another object of the axial fluid flow and sound speed measurement apparatus and method is to provide accurate and stable measurement within the transition zone. Another object of the axial fluid flow and sound speed measurement apparatus and method is to provide average measurements directly by filling the conveyance section with a uniform longitudinal energy wave front which passes through a number of all existing flow states.

Another object of the axial fluid flow and sound speed measuring apparatus and method is to remove the need to know the flow profile in the fluid conveyance to obtain average measurements.

Another object of the action fluid flow and sound speed measurement apparatus and method is to provide measurement means with negligible effect on the flow characteristics.

Another object of the axial fluid flow and sound speed measurement apparatus and method is to provide a system wherein the calibration constants in the electronic circuitry for use with the transducers depends only upon the conveyance cross sectional dimensions.

Another object of the axial fluid flow and sound speed measurement apparatus and method is to provide a method of measurement which involves filling the fluid conveyance with a uniform longitudinal energy wave front for sufficient distance along the direction of the major flow component to average all flow components and indicate the magnitude and longitudinal direction of the average flow component.

Additional objects and features of the axial fluid flow and sound speed measurement apparatus and method will appear from the following description in which the preferred embodiments are set forth in detail in conjunction with the accompanying drawings.

DESCRIPTION OF THE PREFERRED EMBODIMENTS

The fluid flow and sound speed measuring apparatus detects fluid physical and dynamic properties by monitoring the manner in which ultrasonic wave energy is propagated through the fluid. The present invention is dependent upon the manner in which the wave energy is injected into the fluid and the wave front dimensions and direction relative to the fluid conveyance dimensions and direction. This invention involves filling the fluid conveyance with a uniform longitudinal wave front travelling substantially parallel to the longitudinal axis of the fluid conveyance.

Figure 1:
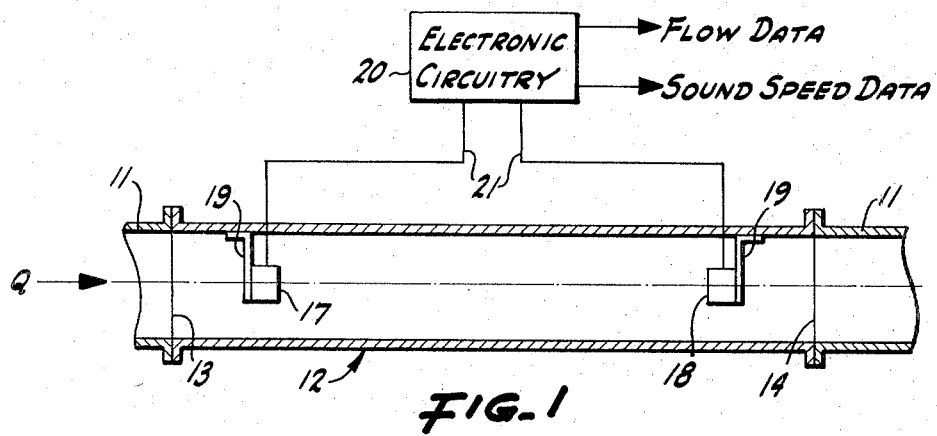
FIG. 1 is a sectional view through a fluid flow path metering section.

In FIG. 1 there is shown fluid conveyance 11 conducting a fluid flow Q. A section 12 of the conveyance is provided with an inlet 13 and an outlet 14. An upstream transducer 17 and a downstream transducer 18 are disposed in communication with the fluid in the section 12 on mounting means 19. Electronic circuitry 20 is connected to the upstream and downstream transducers 17 and 18 through electrical conductors 21. Electronic circuitry 20 may be of the type described in copending applications, Ser. No. 250,760 filed May 5, 1972, or Ser. No. 268,712 filed July 3, 1972, which are hereby incorporated by reference.

One form of the circuit 20 is described in copending application, Ser. No. 250,760 filed May 5, 1972 and includes a voltage controlled oscillator (VCO) which provides pulses to a data count circuit which counts the applied pulses for a predetermined time to provide fluid flow information. The output of the VCO is operated upon to provide first and second signals which are compared to develop a control voltage for the VCO. The first signal is generated when a count control device is operated by a VCO output pulse. The output of the count control triggers a transmitter pulse generator. A first transducer is mounted in the wall of a fluid conduit or channel and is in communication with the fluid. The pulse delivered from the generator is applied to the transducer and the energy imparted to the fluid propagates through the fluid and is received by a second transducer in communication with the fluid. The second transducer is situated in the wall of the fluid conduit in a position generally upstream or downstream from the first transducer. Thus, the energy propagated through the fluid travels in a direction such that a component of the propagation direction parallels a component of the fluid flow direction. Depending upon the direction of flow, the energy pulse transmitted through the fluid will be aided or opposed, whereby transit times upstream and downstream will be different. The received energy is connected to a receiver circuit. The received pulse is delivered to time of arrival circuit as the first signal.

The second signal is generated by dividing the VCO pulses received after the first pulse is generated. A divider means generates the second signal a given number of VCO pulses after the transmitted pulse which gives a predetermined delay. The delay time is a function of the output frequency of the VCO; a higher frequency providing a shorter delay and conversely a lower frequency providing a longer delay. The delayed pulse is delivered to the time of arrival circuit as the second signal which also receives the actual received pulse as the first signal. This latter circuit provides time phase comparison between the actual received pulse and the delayed pulse and a resulting uniform error charge is dispensed to the input of the VCO to change the output frequency of the VCO causing the output initiated by the divider to coincide in time with the actual received pulse. The foregoing generation and comparison of first and second signals and uniform error charge continues, maintaining the delayed pulse in time coincidence with the processed received pulse. VCO output pulses are counted for a predetermined period of time while the delayed and received pulses are maintained in coincidence and stored for comparison with the pulse count obtained when energy is transmitted in the opposite direction through the fluid. The time during which counts are collected and recorded in any specific system varies from a fraction of a second to several seconds depending upon the physical characteristics of the fluid conduit and the parameters of the fluid itself.

Another form of the circuit 20 is disclosed in copending application, Ser. No. 268,712 filed July 3, 1972 which provides for direct synthesis of a data frequency proportional to the flow of the medium and of a frequency proportional to the speed of sound in the medium from a single voltage controlled oscillator. The synthesized signals are derived from signals proportional to sound energy transit times through the fluid in generally upstream and downstream directions. The data frequency and oscillator frequency are combined using standard upper and lower sideband separation techniques, balanced modulators, and linear frequency mixers. The results are frequencies proportional to upstream and downstream sound speeds through the medium which are used to control transmission direction, selection of the proper transducer for reception, and synthesis of the sound speed and flow data frequencies. The system includes a transmit/receive network wherein the switch selections are made which provides for alternate functioning of the transducers as transmitter and receiver and receiver and transmitter respectively. The received signal is delivered from the transmit/receive network to a detector network. The detector network shapes the received pulse in a manner disclosed in copending application, Ser. No. 250,760. A control network generates a reference pulse which is directed to the detector network. A phase comparison between the received pulse and the reference pulse is performed in the detector network and a signal with its polarity determined by the relative early or late nature of the received pulse is directed to the control network. The control network performs summations of the early/late signals which are delivered to a frequency synthesizing network. The synthesizing network operating on the summations provides frequencies which are proportional to the upstream and downstream sound propagation velocities. These frequencies are directed to the control network to provide control signals which properly sequence the transmit/receive switching performed in the transmit/receive network. The control signals from the control network are also connected to the detector network providing proper signal sequence for the received signal and reference signal phase comparison, a receiver amplifier automatic gain control, and a "no signal" indication alarm. The summations of the early/late signals from the control network are utilized directly within the frequency synthesizing network to control the output frequency of a voltage controlled oscillator (VCO) and to generate a data frequency. The output of the VCO provides a frequency proportional to the speed of sound through the flowing medium. The data frequency is proportional to flow. A time calibration circuit receives the data frequency converting it to totalized flow or flow rate, as desired, on visual indicators responsive to the output from the time calibration circuit.

Figure 2:
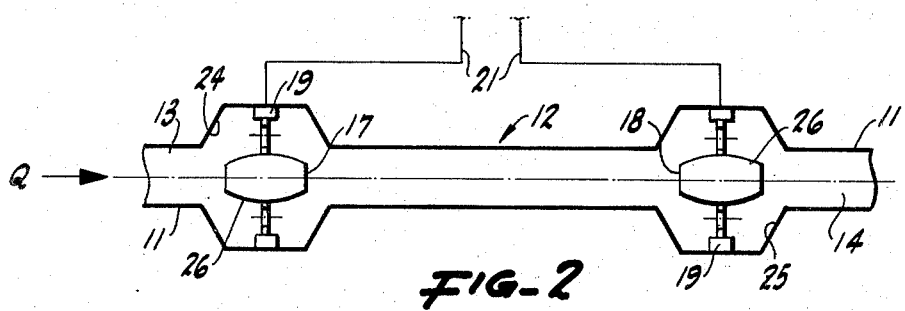
FIG. 2 is a diagramatic view of a fluid flow path metering section.

One of the preferred embodiments is seen in FIG. 2. A section 12 having an inlet 13 and an outlet 14 is shown inserted in a fluid conveyance 11. Similar chambers 24 and 25 are constructed at the inlet and outlet ends of section 12. Mounting means 19 are shown supporting upstream and downstream ultrasonic transducers 17 and 18 within chambers 24 and 25 respectively. A housing 26 covers each of the ultrasonic transducers 17 and 18 and is shaped to prevent cavitation from occuring at any point on the piezoelectric crystal surfaces of transducers 17 and 18 which are in communication with the fluid. Electrical conductors 21 connect the transducers 17 and 18 to the electronic circuitry 20.

Referring again to FIG. 2 the manner in which this particular embodiment operates will be discussed. Flow in this instance is indicated by the arrow. The metering section 12 of the conveyance 11 is designed to cause no pressure drop in the fluid as it flows through the meter. To accomplish this it is necessary that the cross sectional area at any portion in the section 12 including the chambers 24 and 25 be at least as great as the cross sectional area in the fluid conveyance 11. Further the transducer housings 26 must have a shape exposed to the flowing fluid which will not induce cavitation over the faces of the piezo electric material. Such an occurrence would effectively shut the particular transducer off as it would no longer be in communication with the fluid. Another reason for guarding against cavitation is the fact that severe mechanical deterioration may occur. According to the well known Bernoulli theorem if at any point the velocity head increases there must be a corresponding decrease in the pressure head. There is a minimum absolute pressure possible in any liquid which is termed the vapor pressure of the liquid. Vapor pressure is dependent upon the liquid and its temperature. In the event velocities reach magnitudes which create pressures in the fluid less than the vapor pressure cavities form in the fluid. The violent collapse of the vapor bubbles or cavities can force liquid at high velocity into the irregularities on the surface of the adjacent material. The sudden stoppage of the fluid in the irregularities can produce surge pressures of high intensity on small areas. These surge pressures can exceed the tensile strength of the material, and progressively blast out particles from the surface eroding the surface and giving it a pitted appearance.

Energy is alternately transmitted and received by transducers 17 and 18 in an approximate 6° diverging beam. For example an energy wave transmitted by transducer 17 must travel through a sufficient portion of flow in the section of conveyance 12 to give an indication of average energy wave transit time through either the laminar flow or the numerous turbulence tumbles and swirls in the flow prior to being received by transducer 18. Moreover, the distance between the transducers 17 and 18 must be of sufficient length to allow the transmitted energy wave from transducer 17 to completely fill the section of conveyance 12 prior to being received by transducer 18. These two considerations dictate the minimum distance between the transducers 17 and 18 in section 12 which appears empirically to be in the region of 15 diameters for a circular cross section within section 12. The sequence of transmission and reception by transducers 17 and 18 varies in accordance with the type of electronic circuitry 20 which is used.

Figure 3:
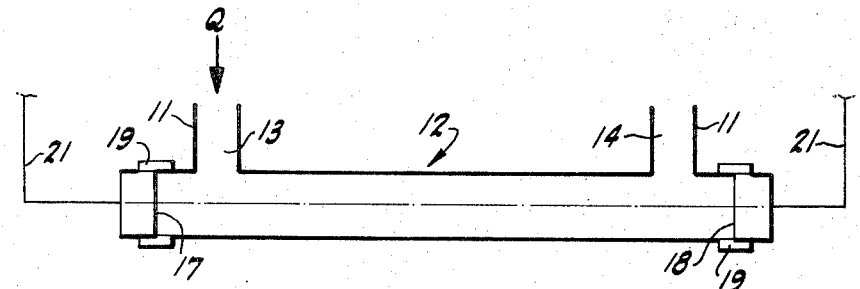
FIG. 3 is a diagramatic view of another embodiment of a fluid flow path metering section.

Another embodiment of the axial fluid flow and sound speed measurement apparatus is shown in FIG. 3. A section of conveyance 12 is shown with an inlet 13 and an outlet 14 in communication with a fluid conveyance 11. An upstream transducer 17 and the downstream transducer 18 are shown mounted axially with the section 12 and secured in place by mounting means 19. Electrical conductors 21 connect the transducers 17 and 18 to electronic circuitry 20 as before.

In this version of the invention the transducers 17 and 18 are mounted axially in the section 12 by mounting means 19 orienting them in such a fashion as to directly face one another at the ends of section 12. The fluid is directed from a fluid conveyance 11 through inlet 13 radially into the section of conveyance 12. Fluid exits from section 12 radially through outlet 14 into fluid conveyance 11. Wave energy transmitted by transducer 17 passes in a longitudinal direction through section 12 to be received by transducer 18. The considerations of sufficient length of section 12 to provide for filling the pipe with the longitudinal wave front prior to being received by transducer 18 and for passing through a sufficient number of laminar flow patterns or turbulence swirls and tumbles to average wave front velocity through section 12 are present in this embodiment as before. The cavitation considerations are not the same here as above because the transducers 17 and 18 are not suspended directly in the path of the fluid flow. It should be noted that the cross sectional area of section 12 is at least as large as the cross sectional area of fluid conveyance 11 to preclude pressure drop through the meter.

Figure 4:
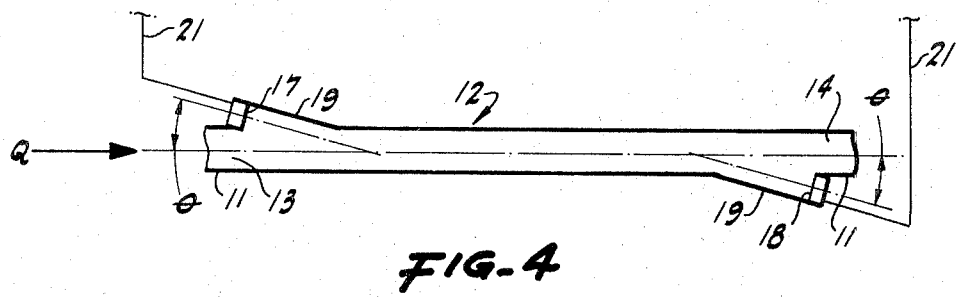
FIG. 4 is a diagramatic view of an additional embodiment of a fluid flow path metering section.

Another embodiment of the invention is seen in FIG. 4 which combines some of the good features of the embodiments just described. Fluid flows from the fluid conveyance 11 directly into the section of conveyance 12 through inlet 13 reentering the fluid conveyance 11 through outlet 14. Mounting means 19 supports upstream transducer 17 and downstream transducer 18 at the sides of section 12. Transducers 17 and 18 do not extend into the flow through section 12. Mounting means 19 are shown on opposite sides of section 12 for convenience only. The relative orientation radially of upstream and downstream mounting means 19 is not critical and may be arrived at through considerations unrelated to fluid flow measurement. Transducers 17 and 18 are again connected to electronic circuitry 20 through electrical conductors 21.

The manner of operation for the configuration shown in FIG. 4 is as follows. Mounting means 19 are formed to provide an angle $\theta$ for injection of the ultrasonic energy wave into the fluid in section 12 which is sufficiently small to allow a uniform longitudinal wave front to form and subsequently travel through a sufficient number of flow irregularities or turbulence to average the wave front transit velocity before being received by transducer 18. Again the minimum distance between transducers 17 and 18 in section 12 is dictated by the considerations of filling section 12 with the longitudinal wave front and passing through sufficient fluid to gain an average wave front velocity.

The transducers utilized in the described embodiments display a 6° ultrasonic energy beam divergence. The physical size of the transducer 17 and 18 must be such that it is capable of filling the section of conveyance 12 with the longitudinal sound wave. The invention disclosed herein relates to a method for measuring fluid flow and sound speed in a fluid through fluid conveyances of small cross section which would not be practical using conventional transducer placement due to the physical limitations in mounting for use with small passages. An angle of 45° to 60° across a small passage is impractical. Flow measurements in pipe sections down to one-eighth inch internal diameter have been made using this method. The axial direction of the ultrasonic energy wave presents a sufficient length of fluid path to make this method of measuring flow practical. The method fills the metering section 12 of conveyance 11 with the ultrasonic energy wave providing stable flow and sound speed measurements in the transition zone ranging from a Reynolds number of 2,000 to about 4,000. This is due to the averaging effect as the wave samples a considerable representative portion of the flow. Prior measurement devices sampled a very small portion of the flow often seeing only one particular swirl in turbulent flow or one segment of flow in the transition zone rapidly alternating between laminar and turbulent flow.

Flow measurement using this method is practical for a large diameter fluid conveyances due to the availability of piezoelectric ultrasonic transducer crystals up to 3 inches in diameter. The consideration is to use a transducer crystal of sufficient size to fill the inside of the metering section 12 of conveyance 11 with the uniform longitudinal wave front. When it is determined that this can be done the next consideration is to space the transducers far enough apart to obtain the averaging effect by passing the ultrasonic wave through a sufficient number of incremental flow elements. When this is done the average flow velocity and the speed of sound in the fluid are determined directly. Prior methods have required a knowledge of the flow velocity profile existing which ranged from a parabolic shape for laminar flow to the theoretic plug flow for the maximum velocity in a given fluid conveyance. With the direct availability of average flow the only constant which must be changed in the electronic circuitry 20 to adapt a system to a different metering section 12 of conveyance 11 is that determined by the inside lateral dimensions of section 12 if it is possible to maintain the distance between transducers constant among different installations of the apparatus.

A fluid flow and sound speed measuring apparatus has been provided which removes the need to know the flow profile for obtaining complete flow information. Measurement is provided through the flow transition zone which is stable and accurate due to the averaging effect of passing the ultrasonic energy wave through a large number of incremental elements of the flowing fluid. An average measurement of the entire flow is obtained because the fluid conveyance is entirely filled with the uniform longitudinal wave front thereby sampling all portion of the flow.

I claim:

1. A fluid flow and sound speed meter for use in measuring flow rate and volume and sound speed in a fluid in a conveyance utilizing ultrasonic energy transmission, comprising at least one pair of ultrasonic energy transducers in communication with said fluid, a metering section of said conveyance of sufficient length to provide a flow path over which energy wave speed is averaged by passage through a representative sample of laminar and turbulent flow states within the metering section, means for mounting and orienting said ultrasonic energy transducers in said metering section proximate to the ends thereof so that said transducers may transmit and receive energy propagated through said fluid in a direction substantially parallel to the longitudinal flow direction through said section, said metering section having an inlet and an outlet in communication with said conveyance, and means electrically connected to the transducers for providing flow and sound speed data, whereby said flow and sound speed data is stable throughout the range of flow conditions including the transition zone.

2. A fluid flow and sound speed meter as in claim 1 wherein said metering section of conveyance comprises a pipe section, at least two spaced chambers along said pipe section which are at least fifteen pipe diameters apart and which are of equal or greater flow cross-section than said conveyance with said inlet directed to the upstream chamber and said outlet directed from the downstream chamber, and mounting means contained in said chambers and shaped to avoid cavitation for contemplated fluids and flow rates for mounting said transducers centrally in said chambers to transmit and receive said ultrasonic energy in a direction parallel to said pipe section longitudinal axis.

3. A fluid flow and sound speed meter as in claim 1 wherein said metering section of conveyance comprises a pipe section at least 15 pipe section diameters long with said inlet and said outlet disposed radially adjacent to the ends thereof, and mounting means at each end of said pipe section for mounting and orienting said transducers to transmit and receive said ultrasonic energy along a path extending parallel to the longitudinal axis of said pipe section and between said inlet and said outlet.

4. A fluid flow and sound speed meter as in claim 1 wherein said metering section of conveyance comprises a modified straight pipe section with said inlet and said outlet disposed axially at the ends thereof, mounting means located in the wall of said pipe section adjacent to the ends thereof and spaced at least fifteen pipe section diameters spart for mounting and orienting said transducers to transmit said ultrasonic energy into said fluid at an angle with the longitudinal axis of said modified straight pipe section which is sufficiently small to accomplish a uniform longitudinal wave front prior to dissipation of transmitted energy in the pipe section walls and to receive said uniform longitudinal wave front.

5. A fluid flow and sound speed meter as in claim 1 wherein said metering section of conveyance comprises a section with lateral dimensions ranging from one-eighth to 1½ inches and a minimum ratio of length to internal diameter for circular cross sections of (15).

6. A fluid flow and sound speed meter for use in measuring flow rate and volume and sound speed in a fluid in a conveyance utilizing ultrasonic energy transmission, comprising a pair of ultrasonic energy transducers in communication with said fluid, a metering section of said conveyance having a circular cross section, means for mounting and orienting said ultrasonic energy transducers in said metering section so that said transducers may transmit and receive energy propagated through the fluid in a direction substantially parallel to the flow direction through said metering section, said means for mounting being spaced apart a minimum of fifteen diameters of said conveyance cross section, said metering section having an inlet and an outlet in communication with said conveyance, and means electrically connected to the transducers for providing flow and sound speed data, said metering section length providing for an averaging effect on wave front velocity through said fluid thereby providing for stable flow and sound speed outputs including flow in the 2000 to 4000 Reynolds number range.

7. The method of fluid flow and sound speed metering for use with a conveyance containing a fluid and at least one pair of ultrasonic energy transducers, comprising mounting the ultrasonic energy transducers in communication with the fluid, transmitting an energy pulse from one of the transducers into the fluid, directing the pulse substantially parallel to the direction of the conveyance, filling the conveyance with a uniform longitudinal wave front, passing the wave front through a sufficient length of the conveyance to traverse representative portions of all modes of flow existing in the conveyance both laminar and turbulent, receiving the energy pulse at the other transducer, determining the times of upstream and downstream wave transmission, and using the times of transmission to generate signals related to flow and sound speeds, whereby stable average flow and sound speed measurements are obtained for all flow conditions including transition zone flow without knowledge of the flow profile at any specific cross section in said metering section.

* * * * *